United States Patent
Xie

(10) Patent No.: US 10,185,077 B2
(45) Date of Patent: Jan. 22, 2019

(54) LED LIGHT BAR CONFIGURED IN BACKLIGHT MODULE AND BACKLIGHT MODULE

(71) Applicant: Wuhan China Star Optoelectronics Technology Co., Ltd., Wuhan, Hubei (CN)

(72) Inventor: Chen Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 35 days.

(21) Appl. No.: 15/521,673

(22) PCT Filed: Mar. 29, 2017

(86) PCT No.: PCT/CN2017/078615
§ 371 (c)(1),
(2) Date: Apr. 25, 2017

(87) PCT Pub. No.: WO2018/161388
PCT Pub. Date: Sep. 13, 2018

(65) Prior Publication Data
US 2018/0275337 A1   Sep. 27, 2018

(30) Foreign Application Priority Data
Mar. 9, 2017   (CN) .......................... 2017 1 0137718

(51) Int. Cl.
*F21V 7/04*   (2006.01)
*F21V 8/00*   (2006.01)

(52) U.S. Cl.
CPC .......... *G02B 6/0085* (2013.01); *G02B 6/009* (2013.01); *G02B 6/0055* (2013.01);
(Continued)

(58) Field of Classification Search
CPC ............................ G02B 6/0085; G02B 6/009
See application file for complete search history.

(56) References Cited

U.S. PATENT DOCUMENTS

| 6,472,823 B2 | 10/2002 | Yen | |
|---|---|---|---|
| 2005/0180142 A1* | 8/2005 | Tsai | F21K 9/00 362/294 |

(Continued)

FOREIGN PATENT DOCUMENTS

| CN | CN201170529 Y | 12/2008 |
|---|---|---|
| CN | CN102900989 A | 1/2013 |

(Continued)

*Primary Examiner* — Evan Dzierzynski
(74) *Attorney, Agent, or Firm* — Andrew C. Cheng

(57) ABSTRACT

The disclosure provides a LED light bar configured in a backlight module, including a light bar circuit board and LEDs disposed on the light bar circuit board. A long side of the light bar circuit board is defined with a nick. The nick forms a first embedding section. A heat dissipation section is disposed in the first embedding section. The disclosure further provides a backlight module, including a light guide plate disposed in a frame, further including the LED light bar configured in a backlight module. Compared with the prior art, the heat dissipation section is disposed on the light bar circuit board to conduct heat of the LEDs out of the backlight module, which reduces the heat in the center of the LED light bar and improves heat dissipation of the backlight module, further preventing the optical films from being wrinkle and dark regions appearing in the backlight module.

12 Claims, 1 Drawing Sheet

(52) U.S. Cl.
CPC ......... *G02B 6/0065* (2013.01); *G02B 6/0068* (2013.01); *G02B 6/0073* (2013.01); *G02B 6/0083* (2013.01); *G02B 6/0051* (2013.01); *G02B 6/0053* (2013.01)

(56) References Cited

U.S. PATENT DOCUMENTS

| | | | | |
|---|---|---|---|---|
| 2010/0118514 | A1* | 5/2010 | Cho | G02B 6/0068 362/97.1 |
| 2011/0286241 | A1* | 11/2011 | Pan | G02B 6/0085 362/607 |
| 2016/0154169 | A1* | 6/2016 | Zhou | G02B 6/0045 349/65 |
| 2016/0377237 | A1* | 12/2016 | Zhang | F21K 9/232 362/311.02 |

FOREIGN PATENT DOCUMENTS

| | | |
|---|---|---|
| CN | CN202973014 U | 6/2013 |
| CN | CN105674132 A | 6/2016 |
| CN | CN106405913 A | 2/2017 |

\* cited by examiner

LED LIGHT BAR CONFIGURED IN BACKLIGHT MODULE AND BACKLIGHT MODULE

TECHNICAL FIELD

The disclosure relates to a liquid crystal panel technology, and more particularly to a LED light bar configured in a backlight module and a backlight module.

DESCRIPTION OF RELATED ART

Displays with high brightness have been the mainstream on the smart device market. A display with high brightness required to be equipped with a backlight module with high brightness, but simultaneously the backlight module with high brightness consumes a large amount of energy and generates a great deal of heat. When the display has been lit on for a long time, the high temperature of the backlight module will cause the local temperature of the smart device to be increased.

The heat generated by the backlight module is mostly concentrated on the LED. As the inside of the backlight is relatively enclosed, excessive heat will cause the temperature around the LED to be over-high. And the temperature of the LED light bar is increasing from edges to the center, adjacent optical films will be winkled due to a large temperature difference in transverse and longitudinal directions. Shadows will appear on backlight visible regions, which are directly resulting in functions of the product out of work.

Conventional smart devices on the market are mostly attached with a piece of graphite on the back of the reflector. The graphite can reduce the temperature difference due to the conductive property, and the wrinkle will be prevented. But the thickness of the backlight module will be increased, and the graphite with large areas can raise costs.

SUMMARY

In order to overcome shortcomings of the prior art, the disclosure provides a LED light bar configured in a backlight module and a backlight module to enhance heat dissipation of the backlight.

The disclosure provides a LED light bar configured in a backlight module, including a light bar circuit board and LEDs disposed on the light bar circuit board. A long side of the light bar circuit board is defined with a nick. The nick forms a first embedding section. A heat dissipation section is disposed in the first embedding section.

In an embodiment of the disclosure, a second embedding section is disposed between LED pads on the first embedding section of the light bar circuit board. The second embedding section extends towards the other long side of the light bar circuit board, an extension section fills the second embedding section on the heat dissipation section.

In an embodiment of the disclosure, the light bar circuit board is a flexible printed circuit board.

In an embodiment of the disclosure, a silica gel layer is disposed between the LED and the extension section.

In an embodiment of the disclosure, the second embedding section is disposed between two LED pads corresponding to each of the LEDs.

In an embodiment of the disclosure, the heat dissipation section and the extension section are graphite plates or conductive metal plates.

The disclosure further provides a backlight module, including a light guide plate disposed in a frame, further including the LED light bar configured in a backlight module. A surface of a side of the light guide plate opposite to a liquid crystal display panel is disposed with optical films. A side of the light guide plate contrary to the liquid crystal display panel is disposed with a reflective plate. Interspaces configured to place the LEDs are defined between the light guide plate and the frame. The LEDs are disposed in the interspaces downwards, opposite to the reflective plate. The light bar circuit board is disposed in the frame and on a surface of a side of the light guide plate opposite to the liquid crystal display panel. The heat dissipation section is disposed on a side of the frame and attached on the frame.

In an embodiment of the disclosure, the frame located with the heat dissipation section is defined with a groove. Edges of the groove, the interspaces and the side of the light guide plate opposite to the liquid crystal display panel form a light bar placement section.

In an embodiment of the disclosure, a side of the frame opposite to the liquid crystal display panel is disposed with a shelter tape, the shelter tape extends towards an edge of the optical films.

In an embodiment of the disclosure, the optical films include a diffusion film and a prism film disposed in a bottom-up sequence.

Compared with the prior art, the disclosure disposes the heat dissipation section on the light bar circuit board to conduct heat of the LEDs out of the backlight module, which reduces the heat in the center of the LED light bar and improves heat dissipation of the backlight module, further preventing the optical films from being wrinkle and dark regions from appearing in the backlight module.

DETAILED DESCRIPTION OF PREFERRED EMBODIMENTS

The disclosure will be described in detail with reference to embodiments and the accompanying drawings as follows.

Figure 1:
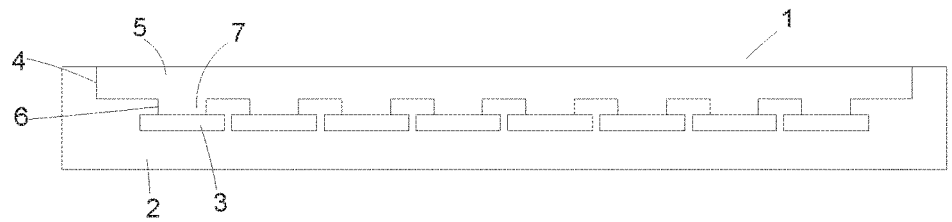
FIG. 1 is a main view of a LED light bar according to the disclosure.
Figure 2:
FIG. 2 is a top view of a LED light bar according to the disclosure.

As shown in FIG. 1 and FIG. 2, the LED light bar configured in a backlight module of the disclosure includes a LED light bar body 1. The LED light bar body 1 includes a striped light bar circuit board 2 and LEDs 3 disposed on the light bar circuit board 2. The LEDs 3 are distributed on the light bar circuit board 2 evenly with the same interval. A long side of the light bar circuit board 2 is defined with a nick. The nick is rectangular. The nick penetrates surfaces of the front and rear sides of the light bar circuit board 2. The nick forms a first embedding section 4. A heat dissipation section 5 is disposed in the first embedding section 4. The shape of the heat dissipation section 5 matches the shape of the first embedding section 4. The heat dissipation section 5 can absorb and conduct heat from the LEDs 3 for reducing heat in the center of the light bar circuit board 2 and prevent the heat from being conducted to the optical films, as well as preventing the optical films from being wrinkle due to the heat and forming dark regions.

The light bar circuit board 2 in the disclosure adopts the flexible printed circuit (FPC) board. The heat dissipation section 5 is press fit on the FPC board directly during the manufacturing process of the FPC board, which can reduce the thickness of the light bar circuit board 2.

Figure 3:
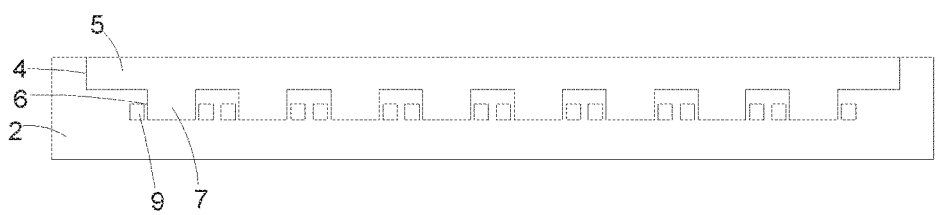
FIG. 3 is a structural schematic view of a light bar circuit board according to the disclosure.

As a preferred embodiment of the disclosure, as shown in FIG. 3, a second embedding section 6 is disposed between LED pads 9 on the first embedding section 4 of the light bar circuit board 2. The second embedding section 6 extends towards the other long side of the light bar circuit board. The second embedding section 6 is rectangular. The first embedding section 4 and the second embedding section 6 are combined to form a rectangular serration structure. An extension section 7 fills the second embedding section 6 on the heat dissipation section 5.

The second embedding section 6 is disposed between two LED pads 9 corresponding to each of the LEDs 3. The second embedding section 6 needs to be disconnected with the two LED pads 9 corresponding to each of the LEDs 3, but the extension section 7 inside and the backs of the LEDs 3 are attached, which can absorb the heat generated by the LEDs 3 thoroughly and deliver the heat to the edge of the side of the light bar circuit board 2 away from the backlight module optical films, further preventing the heat from being conducted to the optical films.

As shown in FIG. 2, a silica gel layer 8 is disposed between the LED 3 and the extension section 7. The silica gel layer 8 is pre-coated. As the tin solder on the LED pads 9 has a certain height during soldering the LEDs, the silica gel layer 8 is disposed between the LED 3 and the extension section 7, which can guarantee the contact of the LEDs and the heat dissipation material. The effect of direct heat dissipation is achieved.

In the disclosure, the heat dissipation section 5 and the extension section 7 are graphite plates or conductive metal plates. The heat dissipation section 5 and the extension section 7 are integrated.

Figure 4:
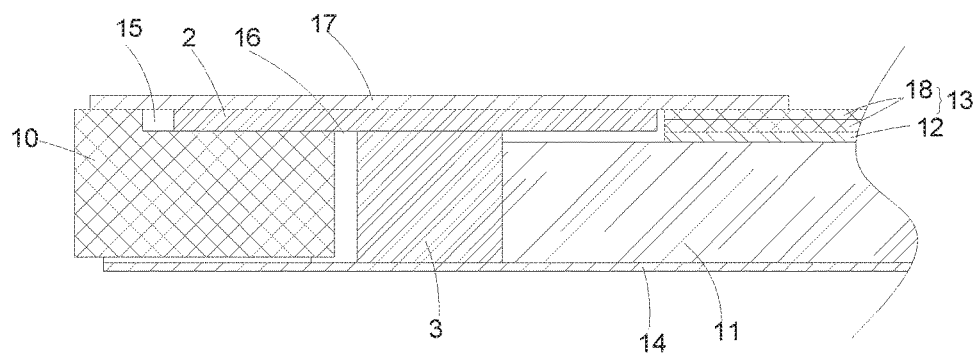
FIG. 4 is a structural schematic view of a backlight module according to the disclosure.

As shown in FIG. 4, the backlight module of the disclosure includes a light guide plate 11 disposed in a frame 10, further including the LED light bar configured in a backlight module. A specific structure of the backlight module is as follows.

The light guide plate 11 is disposed in the frame 10. A surface of a side of the light guide plate 11 opposite to a liquid crystal display panel is disposed with optical films 13. The length of the optical films 13 is shorter than the light guide plate 11, so that a surface appears on the light guide plate 11 uncovered by the optical films 13. A side of the light guide plate 11 contrary to the liquid crystal display panel is disposed with a reflective plate 14. The reflective plate 14 is pasted on the frame 10 by the double sided adhesive tape. The light guide plate 11 is placed on the reflective plate 14. Interspaces configured to place the LEDs 3 are defined between the light guide plate 11 and the frame 10. The LEDs 3 are disposed in the interspaces downwards, opposite to the reflective plate 14. The light bar circuit board 2 is disposed in the frame 10 and on a surface of a side of the light guide plate 11 opposite to the liquid crystal display panel. The heat dissipation section 5 is disposed on a side of the frame 10 and attached on the frame 10. The heat dissipation section 5 conducts the heat of the LEDs 3 to the frame 10. The heat is removed from the optical films, which prevents wrinkle of the optical films and appearance of dark regions.

The frame 10 located with the heat dissipation section 5 is defined with a groove 15. The cross-section of the bottom of the groove 15 is L-shaped. The groove 15 has two holes. One of them penetrates a surface of a side of the frame 10 opposite to the liquid crystal display panel, the other penetrates a surface of a side of the frame 10 opposite to the light guide plate 11. Edges of the groove 15, the interspaces and the side (the surface) of the light guide plate 11 opposite to the liquid crystal display panel form a light bar placement section 16. The light bar placement section 16 is T-shaped. The LEDs on the light bar circuit board 2 are downward to be placed in the interspaces, and the light bar circuit board 2 is disposed in the light bar placement section 16. It should be noticed that the heat dissipation section 5 is properly fit in the groove 15, and attached on the surface of the groove 15.

A side of the frame 10 opposite to the liquid crystal display panel is disposed with a shelter tape 17. A side of the shelter tape 17 is pasted on the frame 10, the other side extends towards an edge of the optical films 13. The back of the light bar circuit board 2 is attached on the shelter tape 17.

In the disclosure, the optical films 13 include a diffusion film 12 and prism films 18 disposed in a bottom-up sequence. The prism films 18 include a bottom prism film and a top prism film.

Although the disclosure is illustrated with reference to specific embodiments, a person skilled in the art should understand that various modifications on forms and details can be achieved within the spirit and scope of the disclosure limited by the claims and the counterpart.

What is claimed is:

1. A LED light bar configured in a backlight module, comprising a light bar circuit board and LEDs disposed on the light bar circuit board, a long side of the light bar circuit board defined with a nick, the nick forming a first embedding section, a heat dissipation section disposed in the first embedding section; and wherein a second embedding section is disposed between LED pads on the first embedding section of the light bar circuit board, the second embedding section extends towards the other long side of the light bar circuit board, an extension section fills the second embedding section on the heat dissipation section.

2. The LED light bar configured in a backlight module according to claim 1, wherein the light bar circuit board is a flexible printed circuit board.

3. The LED light bar configured in a backlight module according to claim 2, wherein a silica gel layer is disposed between the LED and the extension section.

4. The LED light bar configured in a backlight module according to claim 3, wherein the second embedding section is disposed between two LED pads corresponding to each of the LEDs.

5. The LED light bar configured in a backlight module according to claim 4, wherein the heat dissipation section and the extension section are graphite plates or conductive metal plates.

6. A backlight module, comprising a light guide plate disposed in a frame, further comprising a LED light bar configured in a backlight module; the LED light bar configured in the backlight module comprising a light bar circuit board and LEDs disposed on the light bar circuit board, a long side of the light bar circuit board defined with a nick, the nick forming a first embedding section, a heat dissipation section disposed in the first embedding section; a surface of a side of the light guide plate opposite to a liquid crystal display panel disposed with optical films, a side of the light guide plate contrary to the liquid crystal display panel disposed with a reflective plate; interspaces configured to place the LEDs defined between the light guide plate and the frame, the LEDs disposed in the interspaces downwards, opposite to the reflective plate, the light bar circuit board disposed in the frame and on a surface of a side of the light guide plate opposite to the liquid crystal display panel; the heat dissipation section disposed on a side of the frame and attached on the frame;

wherein the frame located with the heat dissipation section is defined with a groove, edges of the groove, the interspaces and the side of the light guide plate opposite to the liquid crystal display panel form a light bar placement section; and wherein a side of the frame opposite to the liquid crystal display panel is disposed with a shelter tape, the shelter tape extends towards an edge of the optical films.

7. The backlight module according to claim 6, wherein the optical films comprise a diffusion film and a prism film disposed in a bottom-up sequence.

8. The backlight module according to claim 6, wherein a second embedding section is disposed between LED pads on the first embedding section of the light bar circuit board, the second embedding section extends towards the other long side of the light bar circuit board, an extension section fills the second embedding section on the heat dissipation section.

9. The backlight module according to claim 6, wherein the light bar circuit board is a flexible printed circuit board.

10. The backlight module according to claim 9, wherein a silica gel layer is disposed between the LED and the extension section.

11. The backlight module according to claim 10, wherein the second embedding section is disposed between two LED pads corresponding to each of the LEDs.

12. The backlight module according to claim 11, wherein the heat dissipation section and the extension section are graphite plates or conductive metal plates.

\* \* \* \* \*